(12) United States Patent
Zechman, III et al.

(10) Patent No.: US 6,358,893 B1
(45) Date of Patent: Mar. 19, 2002

(54) AEROSOL COMPOSITION CONTAINING SILICONE-BASED FLUID AND IMPROVED SPRAY SYSTEM

(75) Inventors: Harry T. Zechman, III, Lancaster; Robert W. Sweger, Willow Street, both of PA (US)

(73) Assignee: Stoner, Inc., Quarryville, PA (US)

( * ) Notice: Subject to any disclaimer, the term of this patent is extended or adjusted under 35 U.S.C. 154(b) by 0 days.

(21) Appl. No.: 09/729,980

(22) Filed: Dec. 6, 2000

Related U.S. Application Data

(63) Continuation-in-part of application No. 09/597,226, filed on Jun. 20, 2000, now abandoned.

(51) Int. Cl.⁷ ............................................ C10M 105/76
(52) U.S. Cl. ...................... 508/215; 508/208; 427/387
(58) Field of Search ............................................ 508/215

(56) References Cited

U.S. PATENT DOCUMENTS

| | | | |
|---|---|---|---|
| 4,099,703 A | 7/1978 | Lush | 251/122 |
| 4,155,864 A | 5/1979 | Martin | 252/63.7 |
| 4,174,386 A | 11/1979 | Spitzer et al. | 424/47 |
| 4,230,243 A | 10/1980 | Spitzer et al. | 222/402.18 |
| 4,439,342 A | 3/1984 | Albanese | 252/305 |
| 4,439,343 A | 3/1984 | Albanese | 252/305 |
| 4,808,323 A | 2/1989 | Fisher et al. | 252/15 |
| 4,863,073 A | 9/1989 | Burt et al. | 222/402.2 |
| 4,863,604 A | 9/1989 | Lo et al. | 210/490 |
| 4,938,887 A | 7/1990 | Grava et al. | 252/68 |
| 5,352,378 A | 10/1994 | Mathisen et al. | 252/54 |
| 5,435,554 A | 7/1995 | Lipson | 273/88 |
| 5,456,948 A | 10/1995 | Mathisen et al. | 427/387 |

(List continued on next page.)

FOREIGN PATENT DOCUMENTS

WO 00/17301 3/2000

OTHER PUBLICATIONS

"Solar Energy Water Heater"; Patent No. 85–14051; Appl. No. 77–41518; Citations from CA Search (85–89):CA3; Apr. 11, 1985; American Chemical Society; 1 Sheet.

"Antistatic Composition fom Cleaning Musical Disks"; Patent No. 75421; Appl. No. 96329; Citations from CA Search (80–84);CA4; Jan. 30, 1981; American Chemical Society; 2 Sheets.

(List continued on next page.)

Primary Examiner—Ellen M. McAvoy
(74) Attorney, Agent, or Firm—Foley & Lardner

(57) ABSTRACT

An aerosol composition includes an admixture of: (a) at least one silicone-based fluid and (b) at least one fluorine-containing propellant that is soluble in the silicone-based fluid. In a preferred embodiment, the propellant includes a hydrofluorocarbon, in particular 1,1,1,2-tetrafluoroethane. An aerosol spray system includes: (a) a container; (b) the aerosol composition described above disposed within the container; (c) a metering device; and (d) a spray head. An aerosol lubricating composition includes the composition described above, wherein the silicone-based fluid is a lubricant. A method of lubricating, includes: (a) directing a container containing the lubricating composition described above at an article in need of lubrication; and (b) spraying the lubricating composition at the article. A flammable aerosol composition includes an aerosol composition which includes an admixture of: (a) at least one silicone-based fluid; and (b) at least one fluorine-containing propellant that is soluble in the silicone-based fluid, wherein the silicone-based fluid is a low viscosity silicone-based fluid. A spray system has improved spray characteristics for the aerosol composition by reducing the flow rate of the composition as it is being dispensed.

25 Claims, 1 Drawing Sheet

U.S. PATENT DOCUMENTS

| | | | | |
|---|---|---|---|---|
| 5,476,603 A | | 12/1995 | Buchwald et al. | 252/58 |
| 5,534,173 A | | 7/1996 | Faber et al. | 508/203 |
| 5,605,682 A | | 2/1997 | Ross et al. | 424/68 |
| 5,925,599 A | * | 7/1999 | Smuda | 508/215 |
| 5,935,554 A | | 8/1999 | Tomlinson | 424/45 |
| 5,975,378 A | | 11/1999 | Bayer | 222/402.24 |
| 6,121,210 A | * | 9/2000 | Taylor | 508/208 |
| 6,149,980 A | | 11/2000 | Behr et al. | 427/388.1 |
| 6,290,930 B1 | | 9/2001 | Blondino et al. | 424/45 |

OTHER PUBLICATIONS

Faber et al.; "Light Duty Lubricant Composition and Method of Use"; Publication No. 00699741; Publication Date Mar. 6, 1996; Citations from European Patent Applications: EPA; 2 Sheet.

Juch; "New Oral Diclofenac Composition"; Patent No. 00519870; Appl No. 92810458; Citations from European Patent Granted: EPB; Sep. 11, 1996; 4 Sheets.

Dupuis et al.; "Cosmetic Hair–Perming Compostion Containiong a Milk Protein and/or A Milk Protein Hydrolysate and A keratin Hydrolysate"; Patent No. 00632715; Appl. No. 93905457; Apr. 24, 1996; 3 Sheets.

Dupuis et al.; "Cosmetic Composition Containing Maltodextrin for Dressing and/or For Fixing The Hair"; Patent No. 00577519; Appl. No. 93401724; Apr. 10, 1996; 2 Sheets.

Nichols; "Shaped Articles Containing Liquefiable Powders for Delivery of Cosmetic and Other Personal Care Agents"; Patent No. 00400910; Appl. No. 90305706; Dec. 5, 1990; 6 Sheets.

Konigs; "Lubricated For The Slide of Trombones or Similar Musical Instruments"; Patent No. 00453783; Appl. No. 91104640; Feb. 8, 1995; 2 Sheets.

Hirose et al.; "Nonflammable Aerosol Composition"; Publication No. 10081804; Publication Date Mar. 31, 1998; Citations from Patent Abstracts of Japan; PAJ; 2 Sheets.

Akasaka et al.; "Fused Carbonate Fuel Cell and Manufacture Thereof"; Publication No. 09306517; Publication Date Nov. 28, 1997; JPO; 2 Sheets.

Nozaki; "Hairdressing"; Publication No. 09143036; Publication Date Jun. 3, 1997; JPO; 1 Sheet.

Karaki et al.; "Release Agent for Die Casting"; Publication No. 09108773; Publication Date Apr. 28, 1997; JPO; 2 Sheets.

Fushimi; "Foamed Laminated Sheet For Automobile Interior Material"; Publication No. 09029876; Publication Date Feb. 4, 1997; JPO; 1 Sheet.

Shibuya et al.; "Rust Preventive Coating Composition"; Publication No. 08073777; Publication Date Mar. 19, 1996; JPO; 1 Sheet.

Bayer; "Aerosol Powder Valve"; Patent No. 05975378; Appl. No. 093811; Nov. 2, 1999; Citations from U.S. Patent Bibliographic Database: PAT; 3 Sheets.

Morawsky et al.; "Low VOC Hair Sprays With Improved Spray Characteristics"; Patent No. 05599524; Appl. No. 267268; Feb. 4, 1997; 2 Sheets.

Faber et al.; "Light Duty Lubricant Composition and Method of Use"; Patent No. 05534173; Appl. No. 298241; Jul. 9, 1996; Citations from U.S. Patent Bibliographic Database; PA1; 2 Sheets.

Byron et al.; "Metered Dose Inhaler Formulations Which Include the Ozone–friendly Propellant HFC 134a and a Pharmaceutically Acceptable Suspending, Solubilizing, Wetting, Emulsifying or Lubrication Agent"; Patent No. 05492688; Appl. No. 217012; Feb. 20, 1996; 2 Sheets.*

Karas et al.; "Method for Deep Drawing Thin Metal Stock Into Containers and Thereafter Coating Each Container"; Patent No. 04637117; Appl. No. 548812; Jan. 20, 1987; Citations from U.S. Patent Bibliographic Database: PA2; 2 Sheets.*

Fisher; "Shaving System For Extended Blade Life"; Patenet No. 03808920; May 7, 1974; Citations from U.S. Patent Bibliographic: PA4; 1 Sheet.*

Fisher; "Shaving System For Extended Blade Life"; Patent No. 03763998; Oct. 9, 1973; 1 Sheet.*

Bayer; "Aerosol Powder Valve"; Publication No. 09964321; Publication Date Dec. 16, 1999; Citations from PCT Database: PCT; 2 Sheets.*

Suzuki et al.; "Stringy Aerosol Composition"; Publication No. 03054246; Publication Date Mar. 8, 1991; Citations from Patent Abstracts of Japan: JP1; JPO & Japio; 2 Sheets.*

Hachiman; "Input Device"; Publication No. 63318621; Publication Date Dec. 27, 1988; Citations from Patent Abstracts of Japan: PJ2; JPO & Japio; 2 Sheets.*

* cited by examiner

US 6,358,893 B1

AEROSOL COMPOSITION CONTAINING SILICONE-BASED FLUID AND IMPROVED SPRAY SYSTEM

CROSS REFERENCE TO RELATED APPLICATIONS

This application is a continuation-in-part of application Ser. No. 09/597,226 filed Jun. 20, 2000 and now abandoned which is incorporated herein by reference in its entirety.

BACKGROUND OF THE INVENTION

1. Field of the Invention

The present invention relates to a composition containing a silicone-based aerosol material and uses of the composition. More particularly, the present invention relates to a silicone-based aerosol lubricating composition and a silicone-based aerosol containing a flammable composition. The present invention also relates to an improved aerosol spray system for dispensing a silicone-based composition.

2. Description of the Related Art

Silicone containing aerosol compositions are well known in uses such as lubricating compositions. See, e.g., U.S. Pat. No. 5,534,173. Most of the known aerosols containing silicones, however, use a solvent to carry the silicone and a propellant to push the silicone and solvent blend out of the aerosol can. While enabling performance, a significant number of these solvents and propellants are known to have adverse effects on the environment and worker safety. Moreover, in recent years there has been an effort to reduce the use of volatile organic compounds and ozone depleting substances in view of their detrimental impact on the environment, their flammability and their hazards in the work place. In addition, in recent years there has also been a trend away from chlorine containing propellants in view of their damaging effects to the ozone layer of the atmosphere and their suspected carcinogenic nature.

The use of silicone-based sprays to lubricate die faces for the manufacture of synthetic fibers in fiber spinning processes is also well known. However, conventional lubricants used to coat the die face suffer from the disadvantage that the worker applying the lubricant is exposed to the heat of the die for a prolonged amount of time needed to adequately lubricate the die face. Therefore, there is a need in the art to provide a silicone-based lubricant which is environmentally friendly, non-flammable, non-carcinogenic and that can also be quickly dispensed from its container under adverse application conditions.

It is generally understood in the art that silicones are heat stable and nonflammable under normal conditions. It is, however, recognized in the art that under certain conditions silicones can become flammable. For example, U.S. Pat. No. 4,155,864 discloses that when silicone fluids are sprayed from leaks in hoses there is a greater than normal fire potential, if ignition sources is also present. In particular, the '864 patent observes that when silicones are sprayed from hoses they can become flammable. Accordingly, an object of their '864 patent is to prevent the flammability of silicone fluids by adding a high molecular weight poly (diorganosiloxane) polymer to the composition. The high molecular weight polymer increases the viscosity of these silicone fluids, which normally have a viscosity ranging from about 7 to about 50 centistokes, to a level of viscosity at which the silicones are no longer considered a flammability hazard. The '864 patent theorizes that the addition of the higher molecular weight polymer alters the formation of silicone particles in such a way as to hinder the formation of separate silicone particles, and thus the atomization of the silicone being sprayed from a hose. The whole gist of the '864 patent is to avoid flammability; the '864 patent does not teach how to provide a composition which is reliably flammable use after use.

Aerosol systems in which the propellant is miscible in the active ingredient are also known. See for example, U.S. Pat. No. 5,935,554, which discloses propellants dissolved in active ingredients, specifically for use in perfumes and insecticides. The '554 patent broadly discloses that propellants can be fluorocarbon, hydrocarbon, hydrofluorocarbon, hydrochlorofluorocarbon, dimethyl ether and any other suitable propellants. The '554 patent exemplifies the use of propellants HCP58 and P28 both of which are hydrocarbons. It is generally known in the art that fluorocarbons are not useful as solubilizing agents. As a result, solubilizing agents are typically required to ensure the performance of fluorocarbon-based formulations. Aerosol systems that contain fluorocarbon and hydrofluorocarbons are also well known in the art. For example, U.S. Pat. No. 5,476,604 discloses compositions which can include a variety of fluorocarbons and hydrofluorocarbons along with release agents such as waxy esters, paraffin or synthetic waxes, polyethylene wax, metal soaps and silicones. The '604 patent indicates that solubilizing agents such as flammable gasoline fractions for the release agents are preferred, because, according to the '604 patent, the fluorocarbons have only a slight dissolving power. In fact, all of the examples of the '604 patent require at least 25 wt. % of a solubilizing agent. Also, the '604 patent indicates the composition can contain only up to 40 wt. % of the release agent.

SUMMARY OF THE INVENTION

One object of the invention is to provide a silicone-based fluid containing aerosol composition, which overcomes the disadvantages of the known art, described above. Another object of the invention is to provide a silicone-based fluid containing aerosol lubricating composition which is not harmful to the environment and which can be readily sprayed under operating conditions, particularly adverse conditions. Another object of the invention is to provide a flammable silicone-containing aerosol, which can be readily and dependably ignited. Still another object of the invention is to provide a silicone containing aerosol lubricant, which can be rendered inflammable for certain uses.

There has been provided according to one aspect of the present invention an aerosol composition which comprises an admixture of: (a) at least one silicone-based fluid; and (b) at least one fluorine-containing propellant that is soluble in the silicone-based fluid. In a preferred embodiment, the propellant comprises a hydrofluorocarbon, in particular 1,1,1,2-tetrafluoroethane.

According to another aspect of the invention, there has been provided, an aerosol spray system comprising (a) a container; (b) the aerosol composition described above disposed within the container; (c) a metering device; and (d) a spray head.

According to still another aspect of the invention, there has been provided an aerosol lubricating composition comprising the composition described above, wherein the silicone-based fluid is a lubricant. In a preferred embodiment, the composition is a nonflammable, heat stable aerosol lubricating composition which comprises an admixture of: (a) a silicone-based lubricant comprising a silicone functionalized with iron present in an amount of about 45 to 55 wt. %; (b) a second silicone-based lubricant present in an amount of about 15 to 20 wt. % and having a viscosity in the range of about 1,000 to 3,000 centistokes; and (c) 1,1,1,2-tetrafluoroethane present in an amount of about 25 to 35 wt. %, all based on the weight of the entire composition.

Yet another aspect of the invention provides a method of lubricating, comprising: (a) directing a container containing the lubricating composition described above at an article in need of lubrication; and (b) spraying the lubricating composition at the article.

Yet another aspect of the invention provides a flammable aerosol composition comprising an aerosol composition which comprises an admixture of: (a) at least one silicone-based fluid; and (b) at least one fluorine-containing propellant that is soluble in the silicone-based fluid, wherein the silicone-based fluid is a low viscosity silicone-based fluid.

Further objects, features and advantages of the present invention will become apparent from consideration of the preferred embodiments which follows.

DETAILED DESCRIPTION OF THE PREFERRED EMBODIMENT

Figure 1:
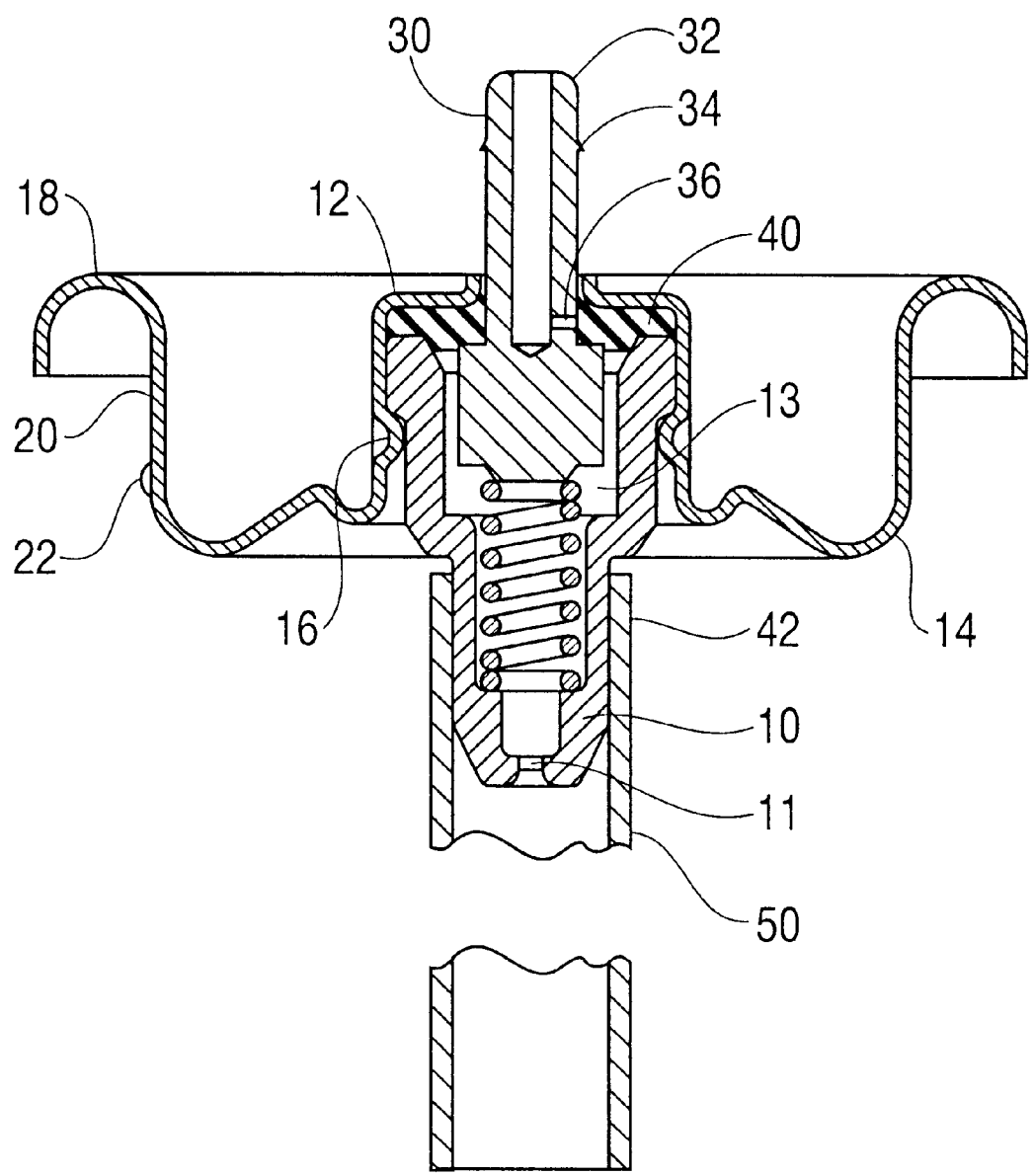
FIG. 1 shows an aerosol spray valve configuration according to one embodiment of the present invention.

As used herein, all percentages are weight percentages based on the total weight of the composition. Unless otherwise indicated herein, all measurements, such as viscosity, are taken at room temperature, i.e., 25° C. The present invention is based, in part, on the discovery that some fluorine-containing propellants, particularly fluorocarbon and hydrofluorocarbon propellants can be solubilized in some silicone-based fluids. This is unexpected in view of the fact that it is known in the art that solvents, which contain increasing numbers of fluorine atoms bonded to the molecule, are relatively immiscible with other compounds, especially silicones. For example as described in *Handbook of Aerosol Technology*, Sanders, $2^{nd}$ ed., incorporated herein by reference in its entirety, there was an understanding in the art of relationship between the molecular structures of chloro and fluorocarbons of the methane series and their Kauri-Butanol values and solubility parameters. Based on this understanding, it was thought that:

(1) Substitution of fluorine for chlorine decreases both the Kauri-Butanol value and the solubility parameter;

(2) Substitution of one hydrogen atom for a chlorine atom results in an increase in the Kauri-Butanol value. Further substitution causes the Kauri-Butanol value to decrease. Kauri-Butanol values reach a maximum with one hydrogen atom in the molecule; and (3) Substitution of hydrogen for chlorine increases the solubility parameter.

This is not the case for the present invention. The discovery of the compatibility of the silicone fluids and fluorocarbon and hydrofluorocarbon compounds has provided a propellant system in which the fluorocarbon or hydrofluorocarbon propellant is dissolved in the silicone based fluid.

As used herein, "soluble" or "miscible" is defined as capable of being dissolved in or as if in a fluid without the aid of any additional agents. That is, soluble is defined as the propellant being miscible in the silicone-based fluid in a system containing only the propellant and silicone-based fluid. In the present invention, the propellant is considered "soluble" or "miscible" if at least 0.3 g propellant/1.0 g silicone is miscible, more preferably at least 0.4, even more preferably at least 0.44 g propellant/1.0 g silicone.

Solubilizing agents are not necessary and while not excluded from some aspects of the invention, they are preferably present in amounts less than about 10 wt. %, preferably less than about 5 wt. %, more preferably less than about 1 wt. %, even more preferably less than about 0.1 wt. %, and most preferably substantially not present or substantially free of. Solubilizing agents as used herein are defined as agents which are used to increase the dissolution of the component being solubilized. Examples of solubilizing agents include those disclosed in U.S. Pat. No. 5,476,603 which is incorporated herein by reference, such as liquid aliphatic hydrocarbons.

As used herein, "silicone-based fluid" is defined as any silicone containing compound, which is liquid at room temperature. There are a number of preferred silicone oils and functional siloxanes which may be used as the silicone-based fluid. These include polydimethysiloxane and poly-dimethylcyclosiloxane of varying viscosities. One preferred polydimethylsiloxane includes DC 200, supplied by Dow Corning. The desired viscosity will depend on the preferred use. Any desired viscosity of silicone-based fluid can be used, depending on the desired spray characteristics of the silicone. In some instances, as more fully described below, a higher viscosity silicone may be added to the silicone-based fluid to control the flammability of the silicone-based fluid dissolved in the propellant.

As used herein, "fluorine-based" propellants are defined as any fluorine containing organic compound, which has a vapor pressure of greater than one atmosphere at ambient conditions, i.e., standard temperature and pressure (STP). Hydrofluorocarbon propellants are well known in the art. See, e.g., U.S. Pat. No. 5,476,603. A particularly preferred hydrofluorocarbon is 1,1,1,2-tetrafluoroethane. This is also known as HFC-134a, sold under the Dymel name by DuPont. Another suitable propellant includes 1,1-difluoroethane, known as HFC-152a. HFC-152a is not as preferred as HFC-134a in view of its flammability characteristics. Still other suitable fluorine-based propellants include HFC-4310 sold by DuPont under the tradename Vertrel, HCFC-141b and HCFC-22. However, HCFC-141b and HCFC-22 have ozone depleting properties and are less preferred.

In view of the discovery that the propellants are soluble in the silicone-based fluids, it is possible to provide a significantly greater quantity of silicone-based fluid than was previously possible. Accordingly, the total amount of the silicone-based fluid added to the aerosol composition admixture can vary broadly. The silicone-based fluid is generally present in the admixture in the range of about 5–95 wt. %. Other acceptable ranges are from about 10–95, 20–95, 30–95, 40–90 wt. %, 45–80, 50–80 wt. %, 60–80 wt. %, and about 65–75 wt. %. The amount of propellant added to the composition is generally in the range of about 5–95 wt. %. Other acceptable ranges are from about 5–80, 20–60 wt. %, 20–50 wt. %, 25–40 wt. %, and from about 25–35 wt. %. It is important to note that the propellant can be in silicone in either an unsaturated, saturated or supersaturated state. If the propellant is present in an unsaturated state, there may be an insufficient amount of propellant to force the entire amount of silicone out of the system. In such a case, the end user could return the unused portion of silicone back to the supplier for recycle, etc.

In a preferred embodiment, the silicone-based aerosol composition is packaged in a spray system. The spray system includes a container such as a metal, preferably aluminum or steel, a metering device disposed at the top of the container for controlling the amount of composition being dispensed from the container; and a spray head for directing the contents of the container. All of these components are well known in the art and are readily available. Described in more detail below, is a particularly useful spray system for use with the composition of the present invention.

The composition can include adjuvants such as corrosion inhibitors, rheology modifiers, low and high temperature stabilizers, high pressure stabilizers, antioxidants, and antimicrobials. All these are well known in the art.

The compositions preferably do not include agents found in cleaning compositions such as 1,2-dichloroethylene, alcohols, ketones, esters, ethers, and hydrocarbon solvents, such as butane, pentane, heptane, octane, and their structural isomers. Also, the composition generally does not include hydrocarbon propellants. Accordingly, while not specifically excluded from some aspects of the invention, these agents and/or hydrocarbon propellants are preferably present in amounts less than about 10 wt. %, preferably less than about 5 wt. %, more preferably less than about 1 wt. %, even more preferably less than about 0.1 wt. % and most preferably substantially not present.

If desired, the present composition may also include chlorine-containing propellants. However, in view of their disadvantages, as described above (e.g., adverse environmental and/or health effects), they are generally not included.

In a preferred aspect of the invention, the silicone-based fluid is a lubricant and the aerosol is a lubricating composition used for lubricating objects, such as the mold faces of spinnerets used in manufacturing synthetic fibers, such as nylon and polyester fibers. As noted above, the ability to dissolve the silicone-based lubricant in a fluorocarbon of hydrofluorocarbon propellant provides a composition that is both environmentally compatible and able to dispense a large quantity of the lubricant in a short amount of time. This second feature is particularly useful in the melt spinning of synthetic fibers where the exposure to processing equipment at high temperatures is typical. The silicone-based lubricant can be present in the amount disclosed above, if it is used alone with the propellant. If it is used with additional silicone-based fluids, it is used in an amount of about 30–70 wt. %. The silicone-based fluid may also be present in amounts from about 35–65, 40–60 and about 45–55 wt. % of the composition.

For higher temperature uses, such as synthetic fiber processing, the silicone-based lubricant is preferably a high temperature resistant lubricant. Preferred thermally stable silicone-based lubricants include silicones functionalized with iron, such as dimethyl and trimethylsilicone functionalized with iron. An especially preferred thermally stable silicone-based lubricant is polydimethylsilicone, which is functionalized with iron. One iron-functionalized silicone is commonly sold under the trade name DC210H, supplied by Dow Corning. The presence of the iron in the silicone provides high temperature stability and inhibits or prevents polymerization of the silicone upon contact with the heated die face. Other high temperature fluids, such as siloxanes which contain special high temperature additives, and phenyl modified siloxanes can also be used in the present invention. Particular silicones include phenymethyl polysiloxanes such as Dow Corning 510, 550 and 710 (all of which are not functionalized with iron), sold by Dow Corning Corporation and mixtures of dimethylpolysiloxane and an organopolysiloxane with phenolic hydroxyl groups such as described in EP A2 894 597 which is herein incorporated by reference in its entirety.

Additional agents such as waxes, wax derivatives, paraffins, metal soaps, fats, oils, polymers and inorganic powders that typically found in lubricating compositions maybe, but are not required to be, present in the present compositions. If the additional agents are present, they are preferably present in amounts less than about 10 wt. %, preferably less than about 5 wt. %, more preferably less than about 1 wt. %, even more preferably less than about 0.1 wt. % and most preferably the compositions are substantially free of these agents.

According to another aspect of the invention, the inventors have found that the combination of a silicone-based fluid dissolved in propellant results in a spray, which is highly flammable. This is particularly surprising, since silicone-based fluids are generally thought to be heat stable and relatively nonflammable. Although not wishing to be bound by any theory, the present inventors believe that the flammability results from a high degree of atomization of the silicone-based fluid due to the dissolved propellant expanding out of the silicone as it is being sprayed. It is believed that this expanding out of the propellant upon conversion from a liquid to a vapor results in the silicone droplets having a high surface area, thus contributing to the flammability of the composition. The average particle size for such a composition can be in the range of about less than about 500 microns and preferably less than about 100 microns. The silicone-based fluid is generally selected to be a lower viscosity fluid to facilitate the formation of small particles sizes. The preferred viscosity is 400 centistokes or less. Other suitable viscosities include 200 centistokes or less, or 100 centistokes or less. A flammable silicone-based aerosol composition can be used in any application requiring a flame. Particularly useful applications include localized high temperature heating of surfaces, automotive repairs, light brazing, laboratory use, shrinking of tubing and connectors and desoldering.

To determine flammability of an aerosol product, the American Society of Testing and Materials (ASTM) 1916 Race Street Philadelphia, Pa. 19103 USA has published a commonly recognized test. The test designation is D 3065–94, which is incorporated herein by reference in its entirety. In summary, the test includes holding the spray can six inches from an open paraffin candle flame and spraying the contents in the direction of the open flame. According to the present invention, an aerosol will be considered flammable if it has a flame extension greater than 18 inches beyond the ignition source, or if it flashes back and burns at the valve with any degree of valve opening, as determined by test D 3065–94.

As noted above, when the aerosol composition is used as a lubricating composition, it may be desirable to control the viscosity and hence the degree of atomization of the silicone to limit or prevent flammability. This is particularly the case in industry where regulations tightly control the use of flammable products in the workplace. The inventors have found that by using a higher viscosity fluid, such as a higher viscosity silicone-based fluid, the spray characteristics of the silicone composition can be controlled to reduce, and preferably eliminate, the flammability of the resulting spray.

Any higher viscosity fluid, in particular silicone-based fluid, can be used to increase the viscosity of the silicone-based lubricant. The viscosity of the higher viscosity fluid can generally vary in the range of from 1,000 to 25,000 centistokes as measured at 25° C. Other acceptable ranges can include 1,000 to 3,000, 1,500 to 2,500 and 2,000 centistokes. A particularly preferred higher viscosity silicone is sold under the designation L405 manufactured by OSi, Inc. The amount of the higher viscosity silicone can vary broadly and is generally in the range of about 3–35 wt. %. Other acceptable ranges include about 7–25, 10–25, 12–20 and about 15 to 20 wt. %. If the higher viscosity silicone is used, the amount of the other silicone included will be decreased to stay within the ranges of the total amount of silicone-based fluid disclosed above.

EXAMPLES

The following examples are offered for purposes of illustration. They are intended neither to define nor limit the present invention in any manner.

Example 1

The following lubricating composition was formulated.

34.5 wt. % Dow Corning DC210H (100 centistoke).

34.5 wt. % OSi L-405 (15,000 centistoke).

31 wt. % HFC-134a

The silicone-based materials were pre-blended and then loaded into aerosol cans. An aerosol valve was then crimped to the can and the HFC-134a was injected. A spray head was then placed onto the valve, which is on the top of the can. The composition was then used to coat heated die faces as described above. The advantages of the aerosol of the present invention to other known compositions includes less time required to spray, therefore exposure time to hot die face and product is less, the die wipe process was easier due to the high concentration of lubricant, and there was no odor. Other health advantages include lack of carcinogens, teratagens, or mutagens. Also, the aerosol was not flammable according to the flame extension test.

The environmental advantages include lack of VOCs and ozone depleting, substances.

Example 2

The following flammable composition was formulated.

69 wt. % Dow Corning DC210H (100 centistoke).

31 wt. % HFC-134a

The silicone-based materials are pre-blended and then loaded into the cans. An aerosol valve is then crimped to the can and the HFC-134a was injected. A spray head is then placed onto the valve, which is on the top of the can.

The product was sprayed and analyzed via the ASTM aerosol flammability test and found to produce a significant flame projection, which is believed to be due to the extensive mechanical breakup of the silicone by the propellant dissolved in the silicone. The flammability was unexpected because the components used in the system are not ordinarily readily flammable.

Examples 3–19

The compositions shown in Table 1 were formulated in the same manner as described above. In the table, "HFE-71DE" is a mixture of hydrofluoroether and dichloroethylene. The other components have been defined above. The resulting compositions had satisfactory lubricating and/or flaming compositions.

As indicated above, an improved aerosol spray system for delivery of the silicone-based spray according to the present invention has been further discovered. Based on the unique property of solubilizing a fluorine-containing propellant in silicone, the silicone-based aerosol composition according to the present invention has a relatively high dispensing rate that provides a short range of application times for operations such as lubricating the die faces of spinnerets. This is generally advantageous in that it limits the amount of time the operator spends in front of the hot mold face applying the composition. However, in some instances, the relatively large amount of silicone-based composition delivered to the mold face in a short period of time allows an undesirable excess of the silicone-based composition to be deposited. When such a condition exists, as the operator scrapes the mold face surface with a metal scraper there exists a potentially hazardous situation where the silicone-based composition, heated by the hot die face, can drip or splash onto the operator.

The flow rate of the composition is sufficiently high due to its unique properties, that reducing the dispensing time does not completely correct the problem, because reduced dispensing time may lead to areas of the die face or other workpiece treated not being coated with the composition, which is disadvantageous. Therefore, an improvement to the delivery system was needed to make the entire application process more user friendly, while at the same time ensuring complete coverage of the object to be sprayed.

The needed improvement to the delivery system was to reduce the flow rate of the composition in order to cut back on the total amount of composition applied, while at the same time providing sufficient coverage. This reduction was accomplished by changing the aerosol delivery system.

Specifically, the present inventors have found that by reducing the size of the valve stem, the flow rate of the composition can be effectively reduced. One component of the valve stem that can be reduced is the size, i.e., the cross sectional area of the orifice that transports the composition from the interior of the container and out of the valve stem. FIG. 1, described more fully below, depicts one embodiment having a single orifice 36. For a single orifice valve stem, the inventors have found that an orifice having a diameter on the order of 0.024 inches or less, preferably in the range of 0.012 to 0.020, more preferably 0.013 to 0.016 inches provides improved flow rates that overcome the disadvantages described above. Of course more than one orifice such as double orifices can be used. If double orifices are used, then the sizes of the orifices will be sized smaller to account for the increased number of orifices. For example, for double orifices, a diameter on the order of 0.006 to 0.010 inches will work satisfactorily.

Another unexpected effect of reducing the size of the valve stem was the construction of the dip tube. With a conventional length dip tube there was some constriction of the tube opening which resulted in sporadic composition delivery rates at a reduced flow rate. Accordingly, the use of a shorter dip tube precludes any possible constriction at the intake of the tube. Thus, in a preferred embodiment, along with the change to the valve stem to reduce flow rate, the dip tube length is also decreased to keep a uniform repeatable composition delivery possible. A decrease of 1% or greater, preferably 2% or greater based on the original length of the dip tube works satisfactorily. Of course, too great of a decrease will result incomplete dispensing of the product.

FIG. 1 is a schematic diagram of an aerosol spray valve atop a container for containing the silicone-based composition according to a preferred embodiment of the present invention. As FIG. 1 depicts, valve body 10 is held in place within the turret/pedestal 12 of cup 14 by clinch 16. The cup is held within the container (not shown) by cup curl 18, crimp 20 and dimple 22. Valve stem 30 is contained within the valve body 10 and includes stem 32, barb 34 and orifice 36. The valve stem and valve body are held in a sealing relationship by stem gasket 40. A spring 42 is positioned between the bottom of valve stem 30 and an interior bottom of valve body 10. The spring biases valve stem 10 up against a bottom surface of the stem gasket 40. At the bottom of valve body 10 is an orifice 11 that provides a fluid communication between the interior 13 of the valve body and the contents of the container. Attached to the bottom of valve body 10 is dip tube 50.

Upon actuation, a user presses valve stem 30 in a downward direction against spring 42. As the valve stem is depressed, the orifice 36 moves from a position of abutting the stem gasket down into the interior 13 of the valve body. In this position, the contents of the container, which are under pressure due to the propellant, are forced up through the dip tube 50 into the interior of valve body 13, through orifice 36 and out through stem 32.

By use of a valve stem having a reduced orifice, an improved flow rate of the composition was achieved, which in turn, lead to satisfactory coverage of the workpiece to be sprayed, without excess dispensing of the composition.

We claim:

1. An aerosol composition which comprises an admixture of:
    (a) at least one silicone-based fluid; and
    (b) at least one fluorine-containing propellant that is soluble in the silicone-based fluid, wherein the composition includes less than about 10 wt. % of a solubilizing agent based on the weight of the composition.

2. An aerosol composition according to claim 1, wherein the propellant comprises a hydrofluorocarbon.

3. An aerosol composition according to claim 1, wherein the propellant comprises 1,1,1,2-tetrafluoroethane.

4. An aerosol composition according to claim 1, wherein the amount of the silicone-based fluid added to the admixture is in the range of from about 30 to 95 wt. %, and the amount of propellant added to the admixture is in the range of from about 5 to 80 wt. %, all based on the weight of the entire composition.

5. An aerosol spray system comprising:
    (a) a container;

TABLE 1

| Ex # | DC210H, 100 cSt | L-405, 2,000 cSt | L-405, 5,000 cSt | L-405, 12,500 cSt | L-405, 15,000 cSt | DC200, 100 cSt | Total silicone |
|---|---|---|---|---|---|---|---|
| 3 | 20 | | | | | | 20 |
| 4 | 10 | | | | | | 10 |
| 5 | 10 | | | | | | 10 |
| 6 | 35 | | | | | | 35 |
| 7 | 10 | | | | | | 10 |
| 8 | | | | | | 69 | 69 |
| 9 | | | | | 69 | | 69 |
| 10 | 51.75 | | | | | 17.25 | 69 |
| 11 | 62.1 | | | | 6.9 | | 69 |
| 12 | 51.75 | | | | 17.25 | | 69 |
| 13 | 65.55 | | | | 3.45 | | 69 |
| 14 | 51.75 | | | | 17.25 | | 69 |
| 15 | 51.75 | | 17.25 | | | | 69 |
| 16 | 51.75 | | | 17.25 | | | 69 |
| 17 | 51.75 | 17.25 | | | | | 69 |
| 18 | 51.75 | 17.25 | | | | | 69 |
| 19 | 45.77 | 11.27 | | | | | 57.04 |

| Ex # | HFC-134a | HFE-71DE | HFC-152a | Trichloroethylene | HCFC-141b | HCFC-22 | HFC-4310 |
|---|---|---|---|---|---|---|---|
| 3 | 62.4 | 17.6 | | | | | |
| 4 | 55 | | | 35 | | | |
| 5 | 55 | | | | 35 | | |
| 6 | 65 | | | | | | |
| 7 | 90 | | | | | | |
| 8 | 31 | | | | | | |
| 9 | 31 | | | | | | |
| 10 | 31 | | | | | | |
| 11 | 31 | | | | | | |
| 12 | 31 | | | | | | |
| 13 | 31 | | | | | | |
| 14 | 31 | | | | | | |
| 15 | 31 | | | | | | |
| 16 | 31 | | | | | | |
| 17 | 30.99 | | | | | | 0.01 |
| 18 | 30.01 | | | | | | 0.99 |
| 19 | 31 | | | | | | 11.96 |

While a preferred embodiment of the present invention has been described, it should be understood that various changes, adaptation in modification may be made therein without departing from the spirit of the invention and the scope of the appended claims.

As used herein and in the following claims, articles such as "the," "a," and "an" can connote the singular or plural.

All documents referred to herein are specifically incorporated herein by reference in their entireties.

(b) the aerosol composition according to claim 1 disposed within the container;
   (c) a metering device; and
   (d) a spray head.

6. An aerosol lubricating composition comprising the composition according to claim 1, wherein the silicone-based fluid is a lubricant.

7. An aerosol lubricating composition according to claim 6, wherein the admixture further comprises, a second silicone-based lubricant.

8. An aerosol lubricating composition according to claim 6, wherein the silicone-based lubricant comprises a siloxane functionalized with iron.

9. An aerosol lubricating composition according to claim 6, wherein the silicone-based lubricant comprises a dimethyl silicone functionalized with iron.

10. A nonflammable, heat stable aerosol lubricating composition which comprises an admixture of:
(a) a silicone-based lubricant comprising a silicone functionalized with iron present in an amount of about 45 to 55 wt. %;
(b) a second silicone-based lubricant present in an amount of about 15 to 20 wt. % and having a viscosity in the range of about 1,000 to 3,000 centistokes; and
(c) 1,1,1,2-tetrafluoroethane present in an amount of about 25 to 35 wt. %, all based on the weight of the entire composition, wherein the composition includes less than about 10 wt. % of a solubilizing agent based on the weight of the composition.

11. A method of lubricating, comprising:
(a) directing a container containing the lubricating composition according to claim 6 at an article in need of lubrication; and
(b) spraying the lubricating composition at the article.

12. A method of lubricating as claimed in claim 11, wherein the article is the die face of an extruder for manufacturing synthetic fibers.

13. A flammable aerosol composition comprising the composition according to claim 1, wherein the silicone-based fluid is a low viscosity silicone-based fluid.

14. A flammable aerosol composition according to claim 13, where, upon spraying, the low viscosity silicone-based fluid has an average particle size of less than about 500 microns.

15. A flammable aerosol composition according to claim 13, where, upon spraying, the low viscosity silicone-based fluid has an average particle size of less than about 500 microns.

16. A flammable aerosol composition according to claim 13, wherein the low viscosity silicone-based fluid has a viscosity in the range of about $\geq 400$ centistokes.

17. An aerosol composition according to claim 1, wherein the composition contains substantially no solubilizing agent.

18. A method of reducing the dispensing rate of a nonflammable, heat stable aerosol lubricating composition comprising an admixture of: a silicone-based lubricant comprising a silicone functionalized with iron present in an amount of about 45 to 55 wt. %; a second silicone-based lubricant present in an amount of about 15 to 20 wt. % and having a viscosity in the range of about 1,000 to 3,000 centistokes; and 1,1,1,2-tetrafluoroethane present in an amount of about 25 to 35 wt. %, all based on the weight of the entire composition, wherein the method comprises:
(a) providing an aerosol container containing the lubricating composition, wherein the aerosol container includes a valve comprising a valve stem having one or more orifices for transporting the composition from the interior of the container to an outlet passage for the valve stem, wherein said one or more orifices has a reduced cross-section;
(b) directing the container at an article in need of lubrication; and
(c) spraying the lubricating composition at the article, wherein the composition includes less than about 10 wt. % of a solubilizing agent based on the weight of the composition.

19. A method according to claim 18, wherein the one or more orifices for transporting is a single orifice having a diameter in the range of about 0.024 inches or less.

20. A method according to claim 18, wherein the one or more orifices for transporting is a single orifice having a diameter in the range of about 0.012 to 0.020 inches.

21. An aerosol spray system having a reduced dispensing rate comprising:
(a) a nonflammable, heat stable aerosol lubricating composition comprising an admixture of: a silicone-based lubricant comprising a silicone functionalized with iron present in an amount of about 45 to 55 wt. %; a second silicone-based lubricant present in an amount of about 15 to 20 wt. % and having a viscosity in the range of about 1,000 to 3,000 centistokes; and 1,1,1,2-tetrafluoroethane present in an amount of about 25 to 35 wt. %, all based on the weight of the entire composition;
(b) a container;
(c) a valve in fluid communication with the container, wherein the valve includes a valve stem having one or more orifices for transporting the composition from the interior of the container to an outlet passage of the valve stem, wherein said one or more orifices has a reduced cross-section; and
(d) a dip tube, wherein the composition includes less than about 10 wt. % of a solubilizing agent based on the weight of the composition.

22. An aerosol spray system according to claim 21, wherein the dip tube has a decreased length.

23. An aerosol spray system according to claim 21, wherein the one or more orifices for transporting is a single orifice having a diameter in the range of about 0.024 inches or less.

24. An aerosol spray system according to claim 21, wherein the one or more orifices for transporting is a single orifice having a diameter in the range of about 0.012 to 0.020 inches.

25. A method of preventing the constriction of a nonflammable, heat stable aerosol lubricating composition out of an aerosol spray system, wherein the composition comprises an admixture of: a silicone-based lubricant comprising a silicone functionalized with iron present in an amount of about 45 to 55 wt. %; a second silicone-based lubricant present in an amount of about 15 to 20 wt. % and having a viscosity in the range of about 1,000 to 3,000 centistokes; and 1,1,1,2-tetrafluoroethane present in an amount of about 25 to 35 wt. %, all based on the weight of the entire composition, and wherein the method comprises:
(a) providing an aerosol container containing the lubricating composition, wherein the aerosol container comprises a valve comprising a valve stem having one or more orifices for transporting the composition from the interior of the container to an outlet passage for the valve stem, wherein said one or more orifices has a reduced cross-section;
(b) directing the container at an article in need of lubrication; and
(c) spraying the lubricating composition at the article, wherein the decreased length of the dip tube prevents constriction of the composition in the dip tube to provide a uniform repeatable dispensing of the composition, wherein The composition includes less than about 10 wt. % of a solubilizing agent based on the weight of the composition.

* * * * *

UNITED STATES PATENT AND TRADEMARK OFFICE
CERTIFICATE OF CORRECTION

PATENT NO. : 6,358,893 B1
DATED : March 19, 2002
INVENTOR(S) : Harry T. Zechman et al.

It is certified that error appears in the above-identified patent and that said Letters Patent is hereby corrected as shown below:

Column 11, lines 45-67 through Column 12, lines 1-65,
Please cancel claims 18-25.

Signed and Sealed this

Fifteenth Day of July, 2003

JAMES E. ROGAN
*Director of the United States Patent and Trademark Office*